United States Patent [19]

Steinmann

[11] Patent Number: 5,521,282
[45] Date of Patent: May 28, 1996

[54] POLYETHERS CONTAINING HINDERED AMINE SIDE CHAINS AS STABILIZERS

[75] Inventor: Alfred Steinmann, Praroman, Switzerland

[73] Assignee: Ciba-Geigy Corporation, Tarrytown, N.Y.

[21] Appl. No.: 271,704

[22] Filed: Jul. 7, 1994

[30] Foreign Application Priority Data

Jul. 13, 1993 [CH] Switzerland .................. 2099/93

[51] Int. Cl.[6] .................................................. C08G 65/04
[52] U.S. Cl. .......................... 528/419; 528/421; 528/423; 528/424
[58] Field of Search .................. 546/188; 528/419, 528/421, 423, 424

[56] References Cited

U.S. PATENT DOCUMENTS

| | | | |
|---|---|---|---|
| 4,460,725 | 7/1984 | Leistner et al. | 524/102 |
| 4,537,923 | 8/1985 | Slongo et al. | 524/100 |

FOREIGN PATENT DOCUMENTS

| | | |
|---|---|---|
| 0000769 | 2/1979 | European Pat. Off. |
| 0001835 | 5/1979 | European Pat. Off. |
| 0058434 | 8/1982 | European Pat. Off. |
| 0097616 | 1/1984 | European Pat. Off. |
| 0389419 | 9/1990 | European Pat. Off. |

OTHER PUBLICATIONS

Luston & Vass, Macromol. Chem., Macromol. Symp. 27,231 (1989).
Chem. Abstr. 111,58966w.
Chem. Abstr. 111,97092c.
Chem. Abstr. 111,115043u.
Chem. Abstract 111:97092 of CS254695.
Chem. Abstract 111:58966 of CS254698.

*Primary Examiner*—Kriellion S. Morgan
*Attorney, Agent, or Firm*—Michele A. Kovaleski

[57] ABSTRACT

The invention relates to polyethers of the formula I

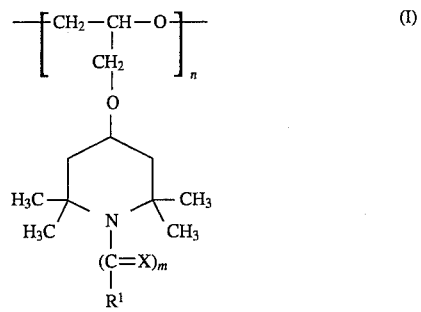

in which m is 0 or 1; n is an integer in the range from 3 to 100; $R^1$, in the case where m is 0 or 1, is $C_1$–$C_{36}$alkyl or $C_7$–$C_{36}$aralkyl, each of which is unsubstituted or substituted by $C_5$–$C_8$cycloalkyl, is interrupted in the aliphatic part by $C_5$–$C_8$cycloalkylene or by oxygen or sulfur or —$NR^{11}$— or is substituted in the aromatic part by 1 to 3 $C_1$–$C_4$alkyl and/or $C_1$–$C_4$alkoxy radicals; $C_3$–$C_{36}$alkenyl; $C_5$–$C_{12}$cycloalkyl which is unsubstituted or substituted by 1 to 4 $C_1$–$C_4$alkyl and/or $C_1$–$C_4$alkoxy radicals; $C_6$–$C_{10}$aryl which is unsubstituted or substituted by 1 to 4 $C_1$–$C_4$alkyl and/or $C_1$–$C_4$alkoxy radicals; and $R^1$, in the case where m is 0, can alternatively be hydrogen; $C_1$–$C_{36}$alkoxy or $C_7$–$C_{36}$aralkoxy, each of which is unsubstituted or substituted by $C_5$–$C_8$cycloalkyl, interrupted in the aliphatic part by $C_5$–$C_8$cycloalkylene or by oxygen or sulfur or —$NR^{11}$— or is substituted in the aromatic part by 1 to 3 $C_1$–$C_4$alkyl and/or $C_1$–$C_4$alkoxy radicals; $C_3$–$C_{36}$alkenyloxy; $C_5$–$C_{12}$cycloalkoxy which is unsubstituted or substituted by 1 to 4 $C_1$–$C_4$alkyl and/or $C_1$–$C_4$alkoxy radicals; or $C_6$–$C_{10}$aryloxy which is unsubstituted or substituted by 1 to 4 $C_1$–$C_4$alkyl and/or $C_1$–$C_4$alkoxy radicals; $R^{11}$ is $C_1$–$C_{18}$alkyl, $C_5$–$C_8$cycloalkyl, phenyl or $C_7$–$C_9$phenylalkyl; and X is an oxygen or sulfur atom.

6 Claims, No Drawings

POLYETHERS CONTAINING HINDERED AMINE SIDE CHAINS AS STABILIZERS

The invention relates to novel compounds which can be obtained by anionic polymerization of derivatives of 4-(2,3-epoxypropoxy)-2,2,6,6-tetramethylpiperidine, to their use as stabilizers for organic material against the harmful effect of light, oxygen and/or heat, and to the corresponding stabilized compositions.

The preparation of some compounds of the 2,2,6,6-tetramethyl-4-(2,3-epoxypropoxy)piperidine type and their use as stabilizers for organic polymers is described, for example, by Luston and Vass, Makromol. Chem., Macrotool. Syrup. 27, 231 (1989); publications having a similar content are references P58966w, P97092c and P115043u in Chem. Abstr. 111 (1989).

EP-A-001 835 describes the further reaction of epoxy group-containing piperidines with dicarboxylic anhydrides to give polyesters.

A homopolymer of 2,2,6,6-tetramethyl-4-(2,3-epoxypropoxy)piperidine which contains tetramethylpiperidine groups in the chain is described in EP-A-769.

There is a continuing demand for novel polymeric light stabilizers having improved use properties which contain tetramethylpiperidine groups as side chains.

The invention them/ore relates firstly to polyethers of the formula I

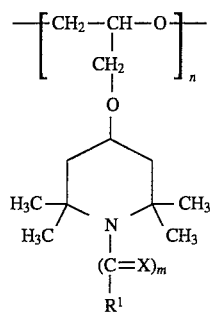

in which m is 0 or 1; n is an integer in the range from 3 to 100; $R^1$, in the case where m is 0 or 1, is $C_1$–$C_{36}$alkyl or $C_7$–$C_{36}$aralkyl, each of which is unsubstituted or substituted by $C_5$–$C_8$cycloalkyl, interrupted in the aliphatic part by $C_5$–$C_8$acycloalkylene or by oxygen or sulfur or —$NR^{11}$— or substituted in the aromatic part by 1 to 3 $C_1$–$C_4$alkyl and/or $C_1$–$C_4$alkoxy radicals; $C_3$–$C_{36}$alkenyl; $C_5$–$C_{12}$cycloalkyl which is unsubstituted or substituted by 1 to 4 $C_1$–$C_4$alkyl and/or $C_1$–$C_4$alkoxy radicals; $C_6$–$C_{10}$aryl which is unsubstituted or substituted by 1 to 4 $C_1$–$C_4$alkyl and/or $C_1$–$C_4$alkoxy radicals; and $R^1$, in the case where m is 0, can alternatively be hydrogen; $C_1$–$C_{36}$alkoxy or $C_7$–$C_{36}$aralkoxy, each of which is unsubstituted or substituted by $C_5$–$C_8$cycloalkyl, interrupted in the aliphatic part by $C_5$–$C_8$cycloalkylene or by oxygen or sulfur or —$NR^{11}$— or is substituted in the aromatic part by 1 to 3 $C_1$–$C_4$alkyl and/or $C_1$–$C_4$alkoxy radicals; $C_3$–$C_{36}$alkenyloxy; $C_5$–$C_{12}$cycloalkoxy which is unsubstituted or substituted by 1 to 4 $C_1$–$C_4$alkyl and/or $C_1$–$C_4$alkoxy radicals; or $C_6$–$C_{10}$aryloxy which is unsubstituted or substituted by 1 to 4 $C_1$–$C_4$alkyl and/or $C_1$–$C_4$alkoxy radicals; $R^{11}$ is $C_1$–$C_{18}$alkyl, $C_5$–$C_8$cycloalkyl, phenyl or $C_7$–$C_9$phenylalkyl; and X is an oxygen or sulfur atom.

In the case where m=0, preferred radicals $R^1$ are those whose free valence is localized on an oxygen atom or a saturated carbon atom.

The structural units of the formula I shown are constitutional repeating units. The polyethers according to the invention can comprise units in which m, X and $R^1$ in each case have the same meanings (homopolymers) or comprise different units of the formula I in which two or more of the meanings given for m, X and/or $R^1$ have been achieved (copolymers). Homopolymers are preferred. The constitutional repeating units can be incorporated in the manner shown in the formula I or otherwise, so that structures of the —$CH_2$—$CH(R)$—O—$CH_2$—$CH(R)$—O—, —$CH_2$—$CH(R)$—O—$CH(R)$—$CH_2$—O— and/or —$CH(R)$—$CH_2$—O—$CH_2$—$CH(R)$—O— type can occur within the polymer chain; R here is in each case the side chain.

The polyethers according to the invention can advantageously be employed for the stabilization of organic material against the harmful effect of light, oxygen and/or heat. A particular advantage of the polyethers according to the invention is their excellent solubility and substrate compatability.

Examples of the meanings of $R^1$ include the following: branched or unbranched $C_1$–$C_{36}$alkyl such as methyl, ethyl, propyl, isopropyl, n-butyl, sec-butyl, isobutyl, t-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl, docosyl, pentacosyl and triacosyl; for example unbranched $C_1$–$C_{18}$alkyl, in particular $C_2$–$C_{18}$alkyl, $C_4$–$C_{18}$alkyl and especially $C_5$–$C_{10}$alkyl; branched or unbranched $C_1$–$C_{36}$alkoxy, in particular $C_6$–$C_{18}$alkoxy, such as hexyloxy, heptyloxy, octyloxy, nonyloxy, decyloxy, undecyloxy and dodecyloxy; $C_5$–$C_8$cycloalkyl-substituted alkyl or alkoxy, such as cyclopentylmethyl, cyclohexylmethyl, cycloheptylmethyl, cyclooctylmethyl, cyclohexylethyl, 2-cyclohexyl-n-propyl, 3-cyclohexyl-n-propyl, 4-cyclohexyl-n-butyl, cyclopentylmethoxy, cyclohexylmethoxy, cycloheptylmethoxy, cyclooctylmethoxy, cyclohexylethoxy, 2-cyclohexyl-n-propoxy, 3-cyclohexyl-n-propoxy and 4-cyclohexyl-n-butoxy; alkyl or alkoxy which is interrupted by $C_5$–$C_8$cycloalkylene or —O—, for example of the formula

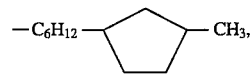

—$C_2H_4$—O—$C_2H_4$—O—$C_{12}H_{25}$, —$(C_2H_4O)_4$—$C_4H_9$. —$(C_2H_4O)_6$—$C_4H_9$; $C_5$–$C_8$cycloalkyl and $C_5$–$C_8$cycloalkoxy which are unsubstituted or alkyl-substituted, such as cyclopentyl, cyclopentoxy, cyclohexyl, cyclohexyloxy, cycloheptyl, cycloheptyloxy, cyclooctyl, cyclooctyloxy, 2- and 4-methylcyclohexyloxy, dimethylcyclohexyloxy, trimethylcyclohexyl, t-butylcyclohexyl, in particular cyclohexyl and cyclohexyloxy; $C_6$–$C_{10}$aryl and -aryloxy which are unsubstitued or substituted by 1 to 3 $C_1$–$C_4$alkyl or $C_1$–$C_4$alkoxy radicals, for example phenyl, phenoxy, naphthyl, naphthoxy, methylphenyl, methylphenoxy, di- and trimethylphenyl, di- and trimethylphenoxy, ethylphenyl, ethylphenoxy, propyl-, in particular isopropylphenyl and -phenoxy, butylphenyl, in particular tert-butylphenyl and -phenoxy, methoxyphenyl, in particular 3-methoxyphenyl, 3- and 4-methoxyphenoxy, 3,5-dimethoxyphenyl, 3,5-dimethoxyphenyl, ethoxyphenyl, ethoxyphenoxy, propoxyphenyl and -phenoxy, butoxyphenyl and -phenoxy; $C_7$–$C_{36}$aralkyl and $C_7$–$C_{36}$aralkoxy, such as benzyl, benzoxy, naphthylmethyl and -methoxy, biphenylmethyl and -methoxy, 2-phenylethyl, 2-phenylethoxy, naphthylethyl and -ethoxy, biphenylethyl and -ethoxy, 3-phenylpropyl, 3-phenylpropoxy, α-methylbenzyl, α-methylbenzoxy, α,α-dimethylbenzyl, α,α-dimethylbenzoxy, phenylbutyl and -butoxy, phenylpentyl and -pentoxy, phenylhexyl and -hexyloxy, phenylheptyl and -heptyloxy, phenyloctyl and -octyloxy, phenylnonyl and -nonyloxy, phenyldecyl and -decyloxy, phenylundecyl and -undecyloxy, phenyldodecyl and -dodecyloxy, phenyltridecyl and -tridecyloxy, phenylpentadecyl and -pentadecyloxy, phenylheptadecyl and -heptadecyloxy, phenyloctadccyl and -octadecyloxy, in particular $C_7$–$C_{12}$phenylalkyl and $C_7$–$C_{12}$phenylalkoxy, especially benzyl, benzoxy, phenethoxy, 3-phenylpropoxy, α-methylbenzyl, α-methylbenzoxy, α,α-dimethylbenzyl and α,α-dimethylbenzoxy; substituted $C_7$–$C_{36}$aralkyl and $C_7$–$C_{36}$aralkoxy, such as 3-methylphenylmethyl, 3,5-dimethylphenylmethyl, 3-methylphenylpropyl, 3,5-dimethylphenylpropyl, 3-butylphenylpropyl, 3,5-dibutylphenylpropyl, 3-methylphenylpropoxy, 3,5-dimethylphenylpropoxy, 3-butylphenylpropoxy and 3,5-dibutylphenylpropoxy.

Aryl stands for an aromatic hydrocarbon residue such as, for example, phenyl or naphthyl. Aralkyl means alkyl which is substituted by an aromatic hydrocarbon residue, e.g. a hydrocarbon residue having 6 to 10 carbon atoms; examples for aralkyl include benzyl and α-methylbenzyl.

Any $R^1$ radicals containing alkyl which is interrupted by —O—, —S— or —$NR^{11}$— are alkyl having at least 2, preferably at least 4, carbon atoms which is preferably interrupted by 1–6 —O— or —S— groups, in particular by 1–6 —O— groups; the hetero atoms are preferably bonded to carbon atoms and not to other hetero atoms, i.e. there are no structures of the —O—O— type. These radicals are particularly preferably polyoxyethylene chains whose ends are saturated by $C_1$–$C_8$alkyl.

In the polymeric compounds of the formula I, n is preferably in the range from 4 to 50, in particular in the range from 5 to 30, especially in the range from 10 to 20. The number average molecular weight $M_n$ measured by gel permeation chromatography is generally from 1000 to 50,000 g/mol, preferably from 1000 to 10,000 g/mol, in particular from 1000 to 5000 g/mol.

X is preferably an oxygen atom.

m is preferably the number 0.

Preference is given to polyethers in which n is an integer in the range from 4 to 50; $R^1$, in the case where m is 0 or 1, is $C_1$–$C_{36}$alkyl; $C_2$–$C_{36}$alkyl which is interrupted by —O—; $C_7$–$C_{36}$aralkyl; $C_7$–$C_{36}$aralkyl which is interrupted in the aliphatic part by —O— and/or is substituted in the aromatic part by 1 to 3 $C_1$–$C_4$alkyl or $C_1$–$C_4$alkoxy radicals; $C_5$–$C_9$cycloalkyl which is unsubstituted or substituted by 1 to 3 $C_1$–$C_4$alkyl or $C_1$–$C_4$alkoxy radicals; or phenyl which is unsubstituted or substituted by 1 to 3 $C_1$–$C_4$alkyl and/or $C_1$–$C_4$alkoxy radicals; and $R^1$, in the case where m is 0, can alternatively be $C_1$–$C_{36}$alkoxy; $C_2$–$C_{36}$alkoxy which is interrupted by —O—; $C_7$–$C_{36}$aralkoxy; $C_7$–$C_{36}$aralkoxy which is interrupted in the aliphatic part by —O— and/or is substituted in the aromatic part by 1 to 3 $C_1$–$C_4$alkyl or $C_1$–$C_4$alkoxy radicals; $C_5$–$C_9$cycloalkoxy which is unsubstituted or substituted by 1 to 3 $C_1$–$C_4$alkyl or $C_1$–$C_4$alkoxy radicals; or phenoxy which is unsubstituted or substituted by 1 to 3 $C_1$–$C_4$alkyl or $C_1$–$C_4$alkoxy radicals; and X is an oxygen atom.

Of these, particular preference is given to those polyethers in which m is 0; $R^1$ is $C_1$–$C_{18}$alkyl; $C_4$–$C_{36}$alkoxy; $C_2$–$C_{18}$alkyl which is interrupted by —O—; $C_4$–$C_{36}$alkoxy which is interrupted by —O—; $C_7$–$C_{18}$phenylalkyl; $C_7$–$C_{18}$phenylalkoxy; $C_7$–$C_{18}$phenylalkyl and $C_7$–$C_{18}$aphenylalkoxy, each of which is substituted on the phenyl ring by 1 to 3 $C_1$–$C_4$alkyl radicals; $C_5$–$C_9$cycloalkyl; $C_5$–$C_9$cycloalkoxy; phenyl which is unsubstituted or substituted by 1 to 3 $C_1$–$C_4$alkyl radicals; or phenoxy which is unsubstituted or substituted by 1 to 3 $C_1$–$C_4$alkyl radicals.

Of particular interest are polyethers of the formula I in which m is 0; $R^1$ is $C_1$–$C_{18}$alkyl; $C_2$–$C_{18}$alkoxy; $C_2$–$C_{18}$alkyl which is interrupted by —O—; $C_4$–$C_{36}$alkoxy which is interrupted by —O—; $C_7$–$C_9$phenylalkyl; $C_7$–$C_9$phenylalkoxy; $C_7$–$C_9$phenylalkyl or $C_7$–$C_9$phenylalkoxy, each of which is substituted on the phenyl ring by 1 to 3 $C_1$–$C_4$alkyl radicals; $C_5$–$C_9$cycloalkyl; $C_5$–$C_9$cycloalkoxy; or phenoxy which is unsubstituted or substituted by b 1 l to 3 $C_1$–$C_4$alkyl radicals; in particular those in which n is an integer in the range from 5 to 30; and $R^1$ is $C_1$–$C_{18}$alkyl; $C_4$–$C_{18}$alkoxy; $C_7$–$C_9$phenylalkyl; or $C_5$–$C_9$cycloalkoxy.

The polyethers according to the invention are expediently prepared by subjecting an epoxide of the formula II

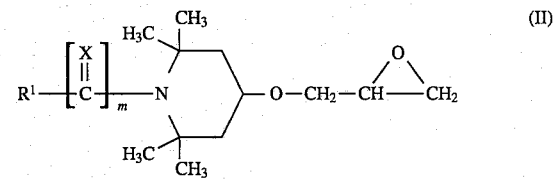

in which $R^1$, X and m are as defined above, or a mixture of compounds of the formula II, to anionic polymerization in a manner known per se. The invention therefore also relates to a polyether obtainable by anionic polymerization of a compound of the above formula II.

The polymerization can be carried out, for example, by one of the methods described by K. C. Frisch and S. L. Reegen (Frisch/Reegen: Ring-Opening Polymerization, Marcel Dekker, New York 1969). The polymerization is generally initiated by one of the conventional initiators for anionic polymerization. These include basic organometallic compounds, such as Grignard compounds, for example of the $C_1$–$C_{12}$alkyl-Mg-Cl or $C_6$–$C_{12}$aryl-Mg-Cl type, alkyl alkali metal compounds, for example $C_1$–$C_6$alkyl-alkali metal compounds, such as tert-butylpotassium, alkali metal alkoxides Me-OR', where Me is, for example, Li, Na or K, and R' is $C_1$–$C_6$alkyl, for example sodium methoxide, potassium methoxide, sodium tert-butoxide, potassium tert-butoxide, lithium ethoxide and sodium ethoxide, and hydroxides and amides, for example NaOH, KOH, sodium amide and lithium amide.

The initiator is expediently added in an amount of 0.1–10 mol %, preferably 1–5 mol %, based on the amount of epoxide of the formula II.

A crown ether, such as 18-crown-6 or 15-crown-5, is preferably added to the mixture, expediently in an amount of 0.1–10 mol %, preferably 1–5 mol %, based on the amount of epoxide of the formula II.

The polymerization is preferably carried out without solvent, but the use of a solvent is possible. The reaction temperature is not crucial, and generally ranges from 10° to 200° C.

Any solvent present must be inert under the reaction conditions. Examples of suitable solvents include aromatic and/or aliphatic hydrocarbons and ethers. Preference is given to high-boiling solvents, or example those whose boiling point at atmospheric pressure is in the range 80°–150° C. Examples of solvents which can be used are benzene, toluene, xylene, ethylbenzene, isopropylbenzene, cyclohexane, diethyl ether, dibutyl ether, tetrahydrofuran and dioxane.

The polymerization is expediently carried out with exclusion of oxygen, for example under argon or nitrogen, and with exclusion of water.

When the polymerization is complete, the products can be worked up by conventional methods. The mixture is expediently first diluted with a suitable solvent, for example tetrahydrofuran. The solution can be purified by filtration, if necessary after dispersion of activated charcoal. The polymer can be precipitated from the solution with the aid of a further solvent of suitable polarity, for example acetonitrile; this can be carried out by introducing the polymer solution into a larger amount of the precipitant. The purification by precipitation can be repeated a number of times if required.

The polymerization and work-up conditions selected determine which end groups are present in the polyethers of the formula I according to the invention. The terminal carbon atoms on the polyether chain can be saturated, for example, by —H or —OH or by a radical of the compound used as initiator. If the initiator employed is, for example, one of the alkoxides $R'^-$ described above and the work-up after the polymerization involves a protic solvent, the terminal groups —OR' and —OH can frequently occur on the terminal carbon atoms.

In principle, however, the type of terminal group is of minor importance for the action of the polyethers according to the invention as stabilizers.

A process for the preparation of a compound of the formula II starts from a piperidine compound of the formula IIa

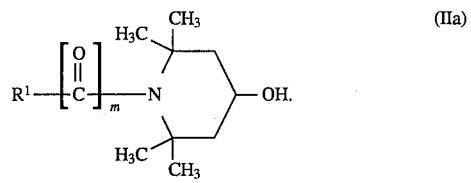

Piperidine compounds of this type are known, and some are commercially available.

For the preparation of a compound of the formula II, the piperidine compound of the formula IIa is expediently reacted with epichlorohydrin.

The epoxide of the formula H can be prepared correspondingly to or analogously to one of the methods described in EP-A-001 835 or in Luston and Vass, Makromol. Chem., Macromool. Syrup. 27, 231 (1989). An excess of epichlorohydrin is expediently added slowly to the piperidine compound of the formula IIa in the presence of strong bases, for example aqueous concentrated alkali metal hydroxide solution, and in the presence of an organic solvent.

The base is advantageously employed in an approximately 2–20-fold molar excess, based on the compound of the formula IIa; for example 3–15 mmol, preferably 4–12 tool, of sodium hydroxide or potassium hydroxide as a 50% aqueous solution are used per mole of piperidine compound. The amount of organic solvent employed is expediently such that the compound of the formula IIa is dissolved completely; examples of suitable solvents are low-polarity to non-polar solvents such as hydrocarbons or ethers, preferably toluene.

1–4 equivalents, preferably 1.2–3 equivalents, in particular 1.5–2.5 equivalents, of epichlorohydrin can be employed per equivalent of the piperidine compound of the formula IIa. In addition, 1–30 mol %, preferably 5–25 mol %, of a tertiary amine salt, for example a tetraalkylammonium halide, such as tetramethylammonium chloride or tetrabutylammonium bromide, or of a phosphonium salt, for example a quaternary phosphonium halide, such as ethyltriphenylphosphonium bromide, can advantageously be added to the mixture as catalyst.

The temperature during the reaction is expediently 0°–100° C., preferably 20°–80° C., in particular 30°–70° C.

The reaction is preferably carried out under a protective gas, for example nitrogen or argon; the reaction mixture is expediently stirred.

When the reaction is complete, the work-up can be carried out by conventional methods; the mixture is expediently first diluted with water, for example by transferring the reaction mixture into 1–4 times the volume of ice water, and the organic phase can subsequently be separated off directly or extracted, for example using ethyl acetate. After the organic phase has been dried, the product can be isolated by removing the solvent. It is also possible to use further purification steps, such as dispersion of activated charcoal, filtration or distillation.

The polyethers of the formula I according to the invention are suitable for the stabilization of organic materials against thermal, oxidative or actinic degradation, for example for stabilization of the following organic polymers:

1. Polymers of monoolefins and diolefins, for example polypropylene, polyisobutylene, polybut1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE), linear low density polyethylene (LLDPE), branched low density polyethylene (BLDPE).

Polyolefins, i.e. the polymers of monoolefins exemplified in the preceding paragraph, preferably polyethylene and polypropylene, can be prepared by different, and especially by the following, methods:

a) radical polymefisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π or σ-coordinated. These metal complexes may be in the free form or fixed on substrates, typically on activated magnesium chloride, titanium(IID) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but 1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/ isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (iondiners) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly($\alpha$-methylstyrene).

6. Copolymers of styrene or $\alpha$-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or $\alpha$-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from $\alpha,\beta$-unsaturated acids and derivatives thereof such as polyacrylates and polymethacrylates; polymethyl methacrylates, polyacrylamides and polyacrylonitfiles, impact-modified with butyl acrylate.

10. Copolymers of the monomers mentioned under 9) with each other or with other unsaturated monomers, for example acrylonitfile/butadiene copolymers, acrylonitrile/alkyl acrylate copolymers, acrylonitrile/alkoxyalkyl acrylate or acrylonitrile/vinyl halide copolymers or acrylonitfile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from aliamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, polyisocyanates or epoxy resins.

26. Crosslinked epoxy resins derived from polyepoxides, for example from bisglycidyl ethers or from cycloaliphatic diepoxides.

27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO.

The invention therefore furthermore relates to compositions comprising (a) an organic material which is sensitive to damage by light, oxygen and/or heat, in particular an organic polymer, and (b), as stabilizer, a polyether of the formula I, and to the use of said polyethers of the formula I for the stabilization of organic material, in particular organic polymers, against damage by light, oxygen and/or heat.

The invention likewise relates to a process for the stabilization of organic material, in particular organic polymers, against damage by light, oxygen and/or heat, which comprises admixing, as stabilizer, a polyether of the formula I to the polymers.

Of particular interest is the use of the polyethers according to the invention as stabilizers for synthetic organic polymers, in particular thermoplastics, for example polyolefins.

The organic materials to be protected are preferably natural, semisynthetic or preferably synthetic organic polymers. Particular preference is given to synthetic organic polymers or mixtures of such polymers, in particular thermoplastics, such as polyolefins, especially polyethylene and polypropylene (PP). Other particularly preferred organic materials are photographic materials or coating compositions. The term photographic materials is taken to mean, in particular, the materials described in Research Disclosure 1990, 31429 (pages 474–480) for photographic reproduction and other reproduction methods. Coating compositions advantageously to be stabilized in the context of the invention are described, for example, in Ullmann's Encyclopedia of Industrial Chemistry, 5th Erin., Vol. A18, pp. 359–464, VCH Verlagsgesellschaft, Weinheim, 1991.

The invention therefore particularly preferably relates to compositions in which the component (a) to be protected is a polyolefin, a photographic material or a surface-coating binder based on acrylic, alkyd, polyurethane, polyester or polyamide resin or corresponding modified resins.

In general, the polyethers according to the invention are added to the material to be stabilized in amounts of from 0.01 to 10 %, preferably from 0.01 to 5 %, in particular from 0.01 to 2 %, based on the total weight of the stabilized composition. The compounds according to the invention are particularly preferably employed in amounts of from 0.05 to 1.5 %, in particular from 0.1 to 1.5 %.

The incorporation into the materials to be stabilized can be carried out, for example, by mixing or application of the polyethers according to the invention and any further additives by conventional methods. For example, the incorporation into the polymers to be protected can be carried out before or during moulding, or by application of the dissolved or dispersed compound to the polymer, if necessary with subsequent evaporation of the solvent. In the case of elastomers, these can also be stabilized as latices. Another method of incorporating the polyethers according to the invention comprises adding them before, during or directly after polymerization of the corresponding monomers or before the crosslinking. The polyethers according to the invention can be added as such or in encapsulated form (for example in waxes, oils or polymers). In the case of addition before or during the polymerization, the polyethers according to the invention can also act as regulators for the chain length of the polymers (chain terminators).

The polyethers according to the invention can also be added to the plastics to be stabilized in the form of a masterbatch, which contains this compound, for example, in a concentration of from 2.5 to 25 % by weight.

The incorporation of the polymers or copolymers according to the invention can expediently be carried out by the following methods:

as an emulsion or dispersion (for example to latices or emulsion polymers), as a dry mix during the mixing of additional components or polymer mixtures, by direct addition into the processing apparatus (for example extruder, internal mixer, etc.), as a solution or melt.

The polymer compositions according to the invention can be used in various forms or converted into various products, for example they can be used as or converted into films, sheets, fibres, tapes, moulding compositions, profiles or as binders for surface coatings, adhesives or adhesive cements.

In addition to the polymers or copolymers according to the invention, the compositions according to the invention can additionally contain conventional additives, for example those mentioned below.

The conventional additives are expediently employed in amounts of 0.1–10 % by weight, for example 0.2–5 % by weight, based on the polymer to be stabilized.

1. Antioxidants 1.1. Alkylated monophenols, or example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-($\alpha$-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-di-nonyl-4-methylphenol, 2,4-dimethyl- 6(1'-methylundec-1'-yl)phenol, 2,4-dimethyl-6-(1'-methylheptadec-1'-yl)phenol, 2,4-di-methyl- 6-(1'-methyltridec-1$\alpha$-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone. 2,5-di-tert-amylhydroquinone, 2,6-di-phenyl-4-octadecyloxyphenol, 2,6-di-tert-butylhydroquinone, 2,5-di-tert-butyl-4-hydroxyanisole, 3,5-di-ten-butyl-4-hydroxyanisole, 3,5-di-tert-butyl-4-hydroxyphenyl stearate, bis-(3,5-di-tert-butyl-4-hydroxyphenyl) adipate.

1.4. Tocophemls, for example $\alpha$-tocopherol, $\beta$-tocopherol, $\gamma$-tocopherol, $\delta$-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis( 6-tert-butyl-2-methylphenol), 4,4'-thiobis-(3,6-di-sec-amylphenol), 4,4'-bis-( 2,6-dimethyl-4-hydroxyphenyl) disulfide.

1.6. Alkylidenebisphenols, for example 2,2'-methylenebis(6-tert-butyl-4-methylphenol), 2,2'-methylenebis(6- tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy2-methylphenyl)pentane.

1.7. O—, N— and S-benzyl compounds, for example 3,5,3',5'-tetra-tert-butyl-4,4'-dihydroxydibenzyl ether, octadecyl-4-hydroxy-3,5-dimethylbenzylmercaptoacetate, tris-(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5di-tert-butyl-4hydroxybenzylmercaptoacelate.

1.8. Hydroxybenzylated malonates, for example diocta-decyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy3-methylbenzylphosphonate, the calcium salt of the monoethyl ester of 3,5-di-tert-butyl-4-hydroxybenzyl-phosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of [β-(5-tert-butyl-4-hydroxy-3-methylphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.21]octane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl- 1-phospha-2,6,7-trioxabicyclo[2.2.29 octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl- 1-phospha-2,6,7-trioxabicyclo[2.2.2]octane.

1.17. Amides of β-(3,5-di-tert-butyl-4-hydroxyphenyl)propionic acid e.g. N,N'-bis( 3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxy-phenylpropionyl)hydrazine.

2. UV ABSORBERS AND LIGHT STABILISERS 2.1. 2-(2'-Hydroxyphenyl)benzotriazoles, for example 2-(2'-hydroxy-5'-methylphenyl)benzotriazole, 2-(3,5' -di-tert-butyl-2'-hydroxyphenyl)benzotriazole, 2-(5'-tert-butyl-2'-hydroxyphenyl)benzotriazole, 2-(3,5-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2-hydroxy-4'-octyloxyphenyl)benzotriazole, 2-(3',5'-di-tert-amyl-2'-hydroxyphenyl)benzotriazole, 2-(3',5'-bis-(α, α-dimethylbenzyl)-2'-hydroxyphenyl)benzotriazole, mixture of 2-(3'-tert-butyl-2'-hydroxy-5'-( 2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-( 2-methoxycarbonylethyl)phenyl)-5-chlorobenzotriazole, 2-(3'-tert-butyl-2'-hydroxy-5'-( 2-methoxycarbonylethyl)phenyl)benzotriazole, 2-(3'-tert-butyl-2'-hydroxy-5'-(2-octyloxycarbonylethyl)phenyl)benzotriazole, 2-(3-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$]$_2$, where R=3'-tert-butyl-4'-hydroxy-5'-2H-benzotriazol-2-ylphenyl.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutylphenyl salicylate, phenyl salicylate, octylphenyl salicylate, dibenzoyl resorcinol, bis(4-tertbutylbenzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl- 4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β, β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-1auroyl-5-hydroxypyrazole, with or without additional ligands.

2.6. Sterically hindered amines, for example bis(2,2,6,6-tetramethyl-piperidyl)sebacate, bis(2,2,6,6-tetramethyl-piperidyl)succinate, bis(1,2,2,6,6-pentamethylpiperidyl)sebacate, bis(1,2,2,6,6-pentamethylpiperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane-tetracarboxylate, 1,1'-(1,2-ethanediyl)bis(3,3,5,5-tetramethylpiperazinone ), 4-benzo yl-2,2,6,6-tetramethylpiperidine, 4-stearyloxy-2,2,6,6-tetramethylpiperidine, bis( 1,2,2,6,6-penta-methylpiperidyl)-2-n-butyl-2-(2-hydroxy-3,5-di-tert-butylbenzyl)malonate, 3-n-octyl- 7,7,9,9-tetramethyl-1,3,8-triazasprio[4.5]decan-2,4-dion, his(1-octyloxy- 2,2,6,6-tetramethylpiperidyl)sebacate, bis(1-octyloxy-2,2,6,6-tetramethylpiperidyl)succinate, the condensate of N,N'-bis-(2,2,6,6-tetramethyl-4-piperidyl)hexamethylenediamine and 4-morpholino-2,6-dichloro-1,3,5-triazine, the condensate of 2-chloro-4,6-bis( 4-n-butyl-amino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl- 7,7,9,9-tetramethyl-1,3,8-triazaspiro[4.5]decane-2,4-dione, 3-dodecyl-1-(2,2,6,6-tetramethyl- 4piperidyl)pyrrolidin-2,5-dione, 3-dodecyl- 1-(1,2,2,6,6-pentamethyl-4-piperidyl)pyrrolidine-2,5-dione.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide and mixtures of ortho- and para-methoxy-disubstituted oxanilides and mixtures of o- and p-ethoxy-disubstituted oxanilides.

2.8.2-(2-Hydroxyphenyl)-1,3,5-triazines, for example 2,4,6-tris(2-hydroxy-4-octyloxyphenyl)- 1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy- 4-dodecyloxyphenyl)-4,6-bis(2,4-dimethylphenyl)-1,3,5-triazine, 2-[2-hydroxy-4-(2hydroxy-3-butyloxy-propoxy)phenyl]-4,6-bis(2,4-dimethyl)-1,3,5-triazine, 2-[2-hydroxy-4-( 2-hydroxy-3-octyloxy-propyloxy)phenyl]-4,6-bis(2,4-dimethyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)-pentaeryt hritol diphosphite, diisodecyloxypentaerythritol diphosphite, bis(2,4-di-tert-butyl-6-methylphenyl)pentaerythritol diphosphite, bis(2,4, 6-tris(tert-butylphenyl)pentaerythritol diphsophite, tristearyl sorbitol triphosphite, tetrakis(2,4-di-tert-butylphenyl) 4,4'-biphenylene diphosphonite, 6-isooctyloxy-2,4,8,10-tetratert-butyl-12H-dibenz[d,g]- 1,3,2-dioxaphosphocin, 6-fluoro- 2,4,8,10-tetra-tert-butyl-12-methyl-dibenz[d,g]-1, 3,2-dioxaphosphocin, bis(2,4-di-tert-butyl-6-methylphenyl)methylphosphite, bis(2,4-di-tert-butyl-6-methylphenyl)ethylphosphite.

5. Peroxide scavengers, for example esters of [3-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis([β-dodecylmercapto)propionate.

6. Polyamidc stabilisers, for example, copper salts in combination with iodides and/or phosphorus compounds and salts of divalent manganese.

7. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmirate, antimony pyrocatecholate or tin pyrocatecholate.

8. Nucleating agents, for example, 4-tert-butylbenzoic acid, adipic acid, diphenylacetic acid.

9. Fillers and reinforcing agents, for example, calcium carbonate, silicates, glass fibres, asbestos, talc, kaolin, mica, barium sulfate, metal oxides and hydroxides, carbon black, graphite.

10. Other additives, for example, plasticisers, lubricants, emulsifiers, pigments, optical brighteners, flameproofing agents, antistatic agents and blowing agents.

11. Benzofuranones and indolinones, for example those disclosed in U.S. Pat. No. 4,325,863, U.S. Pat. Nos. 4,333, 244, 5,175,312, 5,216,052, 5,252,643, DE-A-4 316611, DE-A-4 316 622, DE-A-4 316 876, EP-A-0 589 839 or EP-A-0 591 102 or 3-[4-( 2-acetoxyethoxy)phenyl]-5,7-di-tert-butyl-benzofuran-2-one, 5,7-di-tert-butyl-3-[4-(2-stearoyloxyethoxy)phenyl] benzofuran-2-one, 3,3'-bis[5,7-di-tert-butyl-3-(4-[2-hydroxyethoxy]-phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl- 4-pivaloyloxyphenyl)-5,7 -di-tert-butyl-benzofuran-2-one.

The examples below illustrate the invention in greater detail. All parts and percentages, whether in the examples, in the remainder of the description or in the claims, are by weight, unless specified otherwise. The following abbreviations are used in the examples:

GC: gas chromatography

GPC: gel permeation chromatography

THF: tetrahydrofuran $M_n$: number average molecular weight (unit g/mol)

$M_w$: weight average molecular weight (unit g/mol) Preparation Examples

PREPARATION EXAMPLES

A) Preparation of the Monomers

A1) 1,2,2,6,6-Pentamethyl-4-(2,3-epoxyprooxy)piperidine 300 g (7.5 mol) of sodium hydroxide are dissolved in 300 g of water under an argon atmosphere in a 2.5 l sulfonation flask fitted with mechanical stirrer, condenser and 500 l dropping funnel. 750 ml of toluene, 48.4 g (0.15 mol) of tetrabutylammonium bromide and 257 g (1.5 mol) of 4-hydroxy-1,2,2,6,6-pentamethylpiperidine are added. 347 g of epichlorohydrin (3.75 mol) are added dropwise at 60° C. over the course of 1.5 hours, and the mixture is subsequently stirred at the same temperature for a further 4 hours. The reaction solution is poured in 3 l of ice water, and the organic phase is separated off, dried using sodium sulfate and evaporated. The residue is distilled at 0.05 mmHg over a Vigreux column, and the fraction of boiling point 71°–72° C. is collected.

Yield: 205 g (60%). GC:>99 %.

| | Microanalysis | |
|---|---|---|
| | calculated | found |
| C | 68.68 | 68.64 |
| H | 11.07 | 11.21 |
| N | 6.16 | 6.32 |
| Cl | 0.0 | 0.0 |

$^1$H-NMR (CDCl$_3$): 1.02 and 1.16 ppm (12 H,s): CH$_3$ groups of the piperidine ting 1.32–1.4 ppm and 1.83–1.91 ppm (4 H, m): —CH$_2$ groups of the piperidine ring 2.23 ppm (3 H, s): N-CH$_3$ 2.60–2.62 ppm and 2.78–2.82 ppm (2 H, m): CH$_2$ group of the epoxide ring 3.42–3.47 ppm and 3.71–3.76 ppm (2 H, m): 0—CH$_2$ group 3.57–3.67 ppm (1 H, m): CH-O of the piperidine ring A2) 1-Cyclohexyloxy-2,2,6,6-tetramethyl-4-(2,3-epoxypropoxy)piperidine A2a) 4-Acyloxy-2,2,6,6-tetramethylpiperidine 786.5 g (5 mol) of 4-hydroxy-2,2,6,6-tetramethylpiperidine are introduced under nitrogen into a 10 l flask with plane ground joints fitted with mechanical stirrer, thermometer, condenser and dropping funnel. 300 g (5 mol) of acetic acid and 1531 g (15 mol) of acetic arthydride are added. About 10 drops of concentrated sulfuric acid are slowly added dropwise, and the mixture is stirred at 60° C. for 12 hours. A solution of 1.2 kg of sodium oxide in 3 l of water is added at an internal temperature of below 30° C. The mixture is extracted twice with 1 l of diethyl ether and dried over sodium sulfate, and the solvent is evaporated. The substance is distilled under a water-pump vacuum: boiling point 103° C./15 mmHg.

Yield: 700 g (70 %) GC purity>95 %

| | Microanalysis | |
|---|---|---|
| | calculated | found |
| C | 66.29 | 66.03 |
| H | 10.62 | 10.74 |
| N | 7.03 | 6.93 |

$^1$H-NMR (CDCl$_3$): 1.03–1.18 ppm (2 H,m): —CH$_2$— 1.15 ppm (6 H, s): CH$_3$—C 1.24 ppm (6 H, s): CH$_3$—C 1.89–1.95 ppm (2 H, m): —CH$_2$— 2.03 ppm (3 H, s): CH$_3$COO—

A2b) 1-Cyclohexyloxy-2,2,6,6,tetramethyl-4-acetoxypiperidine 60 g (301 mmol) of 4-acetoxy-2,2,6,6-tetramethylpiperidine are dissolved in 300 ml of cyclohexane under nitrogen in a 1.5 l sulfonation flask fitted with magnetic stirrer, water separator, thermometer and dropping funnel. 4.3 g (30 mmol) of molybdenum oxide are added. 154 g (1.2 mol) of an aqueous 70 % solution of t-butyl hydroperoxide are extracted three times with 35 ml of cyclohexane in each case, and the organic phase is dried over sodium sulfate and transferred into the dropping funnel. The reaction mixture is warmed to reflux, and the t-butyl hydroperoxide solution is added dropwise over the course of 2 hours. Alter a further 2 hours, the elimination of water is complete. The mixture is held at the reflux temperature overnight and is then cooled to 25° C., and the catalyst is filtered off. Ice is added, a little sodium sulfite is added in order to destroy the excess hydroperoxide, and the organic phase is then separated off, washed with water and dried over sodium sulfate, and the solvent is removed on a Rotavap.

Yield: 85 g (95 %) For analytical purposes, the liquid is distilled in a bulb tube. The colourless liquid boils at 115° C./0.05 mmHg. GC analysis: 96 %

| | Microanalysis: | |
|---|---|---|
| | calculated | found |
| C | 68.65 | 68.57 |
| H | 10.51 | 10.49 |
| N | 4.71 | 4.56 |

$^1$H-NMR (CDCl$_3$): 1.19 ppm (12 H,s): CH$_2$—C 1.08–2.02 ppm (14 H, m): —CH$_2$— 2.01 ppm (3 H, s): CH$_3$—C00 4.95–5.05 ppm (1 H, m)

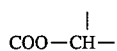

A2c) 1-Cyclohexyloxy-2,2,6,6-tetramethyl-4-hydroxypiperidine 24 g (428 mmol) of potassium hydroxide are dissolved in 600 ml of methanol in a conical flask. 85 g (286 mmol) of 1-cyclohexyloxy-2,2,6,6-tetramethyl-4-acetoxypiperidine are poured into the warm solution with stirring. The mixture is subsequently poured onto ice and extracted with diethyl ether. After the diethyl ether solution has been dried over sodium sulfate, the ether is evaporated and the viscous residue is dissolved in 300 ml of warm acetonitrile. The solution is filtered and allowed to crystallize; yield: 50 g (68 %). The colourless substance has a melting point of 78.5° C.; purity according to GC analysis: 96%.

| Microanalysis | | |
|---|---|---|
| | calculated | found |
| C | 70.54 | 70.55 |
| H | 11.45 | 11.59 |
| N | 5.48 | 5.36 |

$^1$H-NMR (CDCl$_3$): 1.14 ppm and 1.24 ppm (12 H,s): CH$_3$ 1.08–2.07 ppm (14 H, m): —CH$_2$— 3.57–3.62 ppm (1 H, m):

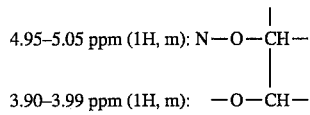

A2d) 1-Cyclohexyloxy-2,2,6,6-tetramethyl-4-(2,3-epoxypropoxy)piperidine 78.4 g (1.96 mol) of sodium hydroxide am dissolved in 80 ml of water under argon in a 50 ml sulfonation flask fitted with stirrer, thermometer and dropping funnel. 100 g (392 mmol) of 1-cyclohexyloxy-2,2,6,6-tetramethyl-4-hydroxypiperidine and 12.6 g (39.2 mmol) of tetrabutylammonium bromide dissolved in 250 ml of toluene are added. The mixture is warmed to 50°–55° C., and 90.7 g (980 mmol) of epichlorohydrin are added dropwise over the course of 45 minutes, during which the mixture is stirred vigorously. The mixture is stirred at 55° C. for a further 3 hours and then poured into 1 liter of ice water, and the organic phase is separated off and washed once with water. The organic phase is dried over sodium sulfate, decoloured using activated charcoal, filtered and evaporated. The residue is distilled over a Vigreux column: boiling point 116°–117° C./0.06 mmHg.

Yield: 78.7 g (64%) GC purity: 98%

| Microanalysis | | |
|---|---|---|
| | calculated | found |
| C | 69.41 | 69.34 |
| H | 10.68 | 11.24 |
| N | 4.50 | 4.39 |

$^1$H-NMR (CDCl$_3$): 1.13 ppm and 1.119 ppm (12 H,s) CH$_3$— 1.08 ppm–2.04 ppm (14 H,m): —CH$_2$— 2.59 ppm–2.81 ppm (2 H, m): CH$_2$ epoxide ring 3.10 ppm–3.43 ppm (2 H, m): CH$_2$ epoxide 3.56 ppm–3.73 ppm (3 H, m): CH epoxide ring and CH—O of the six-membered rings A3) 1Octyloxy-2,2,6,6-tetramethyl-4-(2,3-epoxypropoxy)piperidine 100 g (2.5 tool) of sodium hydroxide are dissolved in 100 ml of water in a 750 ml sulfonation flask fitted with mechanical stirrer, thermometer, dropping funnel and condenser. 71.9 g (0.25 mmol) of 1-octyloxy-2,2,6,6-tetramethyl-4-hydroxypiperidine and 16.1 g (0.05 mol) of tetrabutylammonium bromide am added at 20° C. The mixture is warmed to 30° C. with vigorous stirring. A solution of 277.5 g (3 mmol) of epichlorohydrin and 71.9 g (0.25 mol) of 1-octyloxy-2,2,6,6-tetramethyl-4-hydroxypiperidine is then added dropwise at 35° C. over the course of 75 minutes. The reaction solution is stirred at room temperature for 16 hours and poured onto 1 kg of ice and 100 g of sodium bicarbonate. The organic phase is separated off. The water phase is extracted with ethyl acetate. The two organic phases are washed with sodium chloride-saturated water, dried over sodium sulfate and evaporated on a Rotavap.

The residue is distilled at 130°–134° C./0.01 mmHg, giving 109.8 g (64 %) of a clear, colourless liquid.

| Microanalysis: | C | H | N |
|---|---|---|---|
| calculated | 70.34 | 11.51 | 4.10 |
| found | 70.59 | 11.56 | 4.19 |

$^1$H-NMR (CDCl$_3$) 0.836–1.81 ppm (32H, m): CH$_3$, CH$_2$ piperidine; CH$_3$, CH$_2$ i-octyl, n-octyl 2.59–2.61 ppm and 2.78–2.81 ppm (2H, m): CH$_2$ (epoxide) 3.10–3.15 ppm (1H, m): CH (epoxide) 3.38–3.44 ppm (1H, m): C—O—CH$_2$ 3.56–3.85 ppm (3H, m)

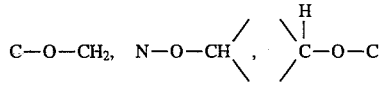

A4) 1-Benzyl-2,2,6,6-tetramethyl-4-(2,3-epoxypropoxy)piperidine 200 g (5 mol) of sodium hydroxide are dissolved in 200 ml of water in a 1.5 1 sulfonation flask fitted with mechanical stirrer, thermometer, condenser and dropping funnel. 247.4 g of 1-benzyl-2,2,6,6-tetramethyl-4-hydroxypiperidine, 32.2 g (0.1 mol) of tetrabutylammonium bromide and 500 ml of toluene are added at 50° C. 185 g (2 mol) of epichlorohydrin are added dropwise at 50°–55° C. with vigorous stirring. The mixture is stirred at 55° C. for 16 hours. The cooled solution is poured into 2 l of water and 220 g of sodium bicarbonate and extracted twice with ethyl acetate. The organic phases are dried and evaporated. The residue is distilled at 120° C./0.008 mmHg, giving 165 g (54 %) of a clear liquid.

| Microanalysis: | C | H | N |
|---|---|---|---|
| calculated | 75.21 | 9.63 | 4.62 |
| found | 75.17 | 9.58 | 4.71 |

$^1$H-NMR (CDCl$_3$): 0.98 and 1.11 ppm (12H, s): CH$_3$ 1.44–1.54 ppm and 1.88–1.97 ppm (4H, m): CH$_2$ (piperidine) 2.62–2.64 ppm and 2.79–2.83 ppm (2H, m): CH$_2$ (epoxide ring) 3.13–3.19 ppm (1H, m): CH (epoxide ring) 3.45–3.51 ppm and 3.73–3.78 ppm (2H, m): CH$_2$ (epoxide) 3.68–3.77 ppm (1H, m)

3.81 ppm (2H, s): N—CH2-aromatic 7.11–7.42 ppm (5H, m): H-aromatic

A5) Preparation of 2,2,6,6-tetramethyl-4-(2,3-epoxypropoxy)piperidine 64.0 g of sodium hydroxide (1.6 mol) are dissolved in 64 ml of water under argon in a 750 ml sulfonation flask fitted with mechanical stirrer, condenser, thermometer and 100 ml dropping funnel. 170 ml of toluene, 10.3 g (31.8 mmol) of tetrabutylammonium bromide and 50 g (318 mmol) of 4-hydroxy-2,2,6,6-tetramethylpiperidine are added. 8.8 g (636 mmol) of epichlorohydrin are added dropwise at 45° C. The mixture is then stirred at 50° C. for 4 hours. The reaction mixture is cooled to room temperature and poured into 1 l of ice water, and the organic phase is separated off, dried using sodium sulfate and evaporated on a rotary evaporator. The residue is distilled at $8 \times 10^3$ mmHg. Boiling point: 48° C., yield: 28 g (41%). GC: 98 %.

| | Microanalysis: | |
|---|---|---|
| | calculated | found |
| C | 67.57 | 67.73 |
| H | 10.87 | 10.92 |
| N | 6.57 | 6.51 |

$^1$H-NMR(CDCl$_3$): 0.577 ppm (1 H): NH 0.81–0.98 ppm (2 H, m): CH$_2$ (piperidine ring) 1.01 and 1.05 ppm (12 H, s): CH$_3$ groups 1.77–1.87 ppm (2 H, m): CH$_2$ (piperidine ring) 2.47–2.50 and 2.66–2.69 ppm (2 H, m): CH$_2$ (epoxide ring) 2.99–3.04 ppm (1 H, m): CH (epoxide ring) 3.31–3.37 and 3.61–3.67 ppm (3 H, m): CH$_2$ (epoxide) and CH—O (piperidine ring)

B) Preparation of the Polymers

B1) Poly[1,2,2,6,6-pentamethyl-4-(2,3-epoxypropoxy)piperidine]

80 g (352 mmol) of the epoxide prepared under A1) are introduced under argon into a water-free 250 ml round-bottom flask. 1.6 g (14.1 mmol) of potassium tert-butoxide and 1.4 g (5.3 mmol) of 18-crown-6 are added. The mixture is stirred by means of a magnetic stirrer, during which the exothermic polymerization commences spontaneously. After 2 hours, the mixture is highly viscous. The mixture is dissolved in tetrahydrofuran, the solution is treated with activated charcoal and filtered, and the product is precipitated in acetonitrile. The oil is separated off, re-dissolved in tetrahydrofuran and precipitated in acetonitrile. The resultant oil is dried in a high vacuum.

Yield of highly viscous polymer: 59.4 g (71% )

| | Microanalysis: | |
|---|---|---|
| | calculated | found |
| C | 68.68 | 68.45 |
| H | 11.07 | 11.49 |
| N | 6.16 | 5.94 |

$^1$H-NMR (CDCl$_3$): No epoxide ring protons are evident in the region between 2.4 and 3.4 ppm, i.e. there is no longer any monomer present. 1.01 ppm and 1.15 ppm (12 H, s): CH$_3$—C 1.24–1.87 ppm (4 H, m): C—CH$_2$—C 2.22 ppm (3 H, s): CH$_3$N 3.49–3.67 ppm (6 H, m): CH—O and CH$_2$—O GPC (THF): Mn=2170; M$_w$=3630; M$_w$/M$_n$=1,67.

B2) Poly[1-cyclohexyloxy-2,2,6,6-tetramethyl-4-(2,3-epoxypropoxy)piperidine]

B2a) *Polymerization using sodium methoxide*

35 g (112.5 mmol) of the epoxide prepared under A2) are introduced into a dry, 50 ml round-bottom flask fitted with magnetic stirrer. 0.2 g (3.7 mmol) of sodium methoxide and 0.8 g (3.6 mmol) of 15-crown-5 are added under argon.

The mixture is allowed to polymerize at 150° C. for 15 hours. The highly viscous material is dissolved in 100 ml of tetrahydrofuran and precipitated in 600 ml of acetonitrile. Re-dissolution and precipitation followed by drying in a high vacuum give a highly viscous material.

Yield: 23.5 g (67 %)

| | Microanalysis: | |
|---|---|---|
| | calculated | found |
| C | 69.41 | 68.99 |
| H | 10.68 | 10.73 |
| N | 4.50 | 4.38 |

$^1$H-NMR (CDCl$_3$): Epoxide ring protons no longer evident GPC (THF): M$_n$=1783, M$_w$=2327, M$_w$/M$_n$=1.3.

B2b) Polymerization using potassium tert-butoxide 15 g (48.2 mmol) of the epoxide prepared under A2), 0.2 g (1.8 mmol) of potassium tert-butoxide and 0.2 g (0.7 retool) of 18-crown-6 are transferred to an ampoule and polymerized at 150° C. for 14 hours under a high vacuum. The solid is dissolved in 60 ml of THF and precipitated in 600 ml of acetonitrile. The resultant oil is re-dissolved in THF and precipitated in acetonitrile. Drying at 40° C. for 3 hours gives a highly viscous material.

Yield: 6 g (40 %)

| | Microanalysis: | |
|---|---|---|
| | calculated | found |
| C | 69.41 | 68.90 |
| H | 10.68 | 10.67 |
| N | 4.50 | 4.33 |

$^1$H-NMR (CDCl$_3$): No epoxide ring protons visible GPC (THF): M$_n$=4670, M$_w$=12500, M$_w$M$_n$=2.68.

B3) Poly[1-octyloxy-2,2,6,6,tetramethyl-4-(2,3-epoxypropoxy)piperidine] 85 g (249 mmol) of the substance prepared under A3), 1.12 g (10 mmol) of potassium tert-butoxide and 1.12 g of 18-crown-6 are introduced under argon into a 100 ml round-bottom flask fitted with magnetic stirrer. The mixture is degasseal three times and polymerized at 150° C. for 20 hours under argon. The solid is dissolved in THF, treated with activated charcoal, filtered and precipitated in acetonitrile. Re-dissolution in THF and precipitation in acetonitrile give 20.2 g (24 %) of a polymer.

| Microanalysis: | C | H | N |
|---|---|---|---|
| calculated | 70.34 | 11.51 | 4.10 |
| found | 68.84 | 11.47 | 4.09 |

GPC (THF): M$_n$ 2390, M$_w$ 3490 TGA (20° C./min, nitrogen): 5 % weight loss at 240° C., two-step weight loss (220°–280° C.: removal of the octyloxy group; 350°–440°

C.: decomposition of the remaining structure)

B4) Poly 1-benzyl-2,2,6,6-tetramethyl-4-(2,3-epoxypropoxy)piperidine]

30 g (98.8 mmol) of the monomer A4), 0.44 g (4 mmol) of potassium tert-butoxide and 0.44 g (1.66 mmol) of 18-crown-6 are introduced into a 100 ml ampoule and freed from oxygen. The mixture is allowed to polymerize at 150° C. for 16 hours under argon. The solid is dissolved in THF and precipitated in acetonitrile. The dissolution and precipitation are repeated. Drying in a high vacuum gives 23.1 g (78 %) of a pale beige solid.

| Microanalysis: | C | H | N |
|---|---|---|---|
| calculated | 75.21 | 9.63 | 4.62 |
| found | 74.50 | 9.61 | 4.27 |

GPC CTHF): $M_n$=3350, $M_w$=5900 TGA (20° C./min, nitrogen): 5 % weight loss at 370° C. DTA (10° C./min): melting point 47° C.

B5) Poly[2,2,6,6-tetramethyl-4-(2,3-epoxypropoxy)piperidine]

53 g (248 mmol) of the epoxide prepared under A5), 1.2 g (10 mmol) of potassium tert-butoxide and 1.2 g of 18-crown-6 are introduced under argon into a 100 ml round-bottom flask fitted with magnetic stirrer. The mixture is degassed three times and allowed to react at 150° C. for 6 hours under argon. The solid material is dissolved in THF, decoloured using activated charcoal, filtered and evaporated, giving a polymer which is soluble in all solvents (water, n-hexane, etc.). This polymer is dried at 70° C. for 4 hours and at 100° C. for 1 hour in a high vacuum, giving 50.3 g of a slightly tacky solid (95 %).

| Microanalysis: | C | H | N |
|---|---|---|---|
| calculated | 67.57 | 10.87 | 6.57 |
| found | 67.44 | 10.86 | 6.51 |

GPC (DMF 0.05M LiBr) $M_n$: 11000 $M_w$: 12000 MALDI (Matrix Assisted Laser Desorption Ionization) $M_n$: 5100 $M_w$: 6100 $^1$H-NMR (CDCl$_3$): 0.66 ppm (1 H, s): NH 0.97–1.04 ppm (2 H, m): CH$_2$ (piperidine ring) 1.14 and 1.18 ppm (12 H, s): CH$_3$ 1.93–1.96 ppm (2 H, m): CH$_2$ (piperidine ring) 3.54–3.67 ppm (6 H, m): CH, CH$_2$ (epoxide) and CHO (piperidine) TGA (2° C./min, air): 10 % weight loss at 290° C.

B6) Copolymer of A1 and A2

24.3 g (107 mmol) of 1,2,2,6,6-pentamethyl-4-(2,3-epoxypropoxy)piperidine (monomer A1), 33.3 g (107 mmol) of 1-cyclohexyloxy-2,2,6,6-tetramethyl-4-(2,3-epoxypropoxy)piperidine (monomer A2), 2.40 mg (2.14 mmol) of potassium tert-butoxide and 240 mg (0.91 mmol) of 18-crown-6 are degasseal and left at 150° C. for 18 hours under argon. After cooling to room temperature, the glasslike solid is dissolved in THF and precipitated in acetonitrile. The material obtained in this way is re-dissolved in THF, decoloured using activated charcoal and precipitated in acetontrile, giving a beige powder which is dried in a high vacuum.

Yield: 51.3 g (89% )

| Microanalysis: | C | H | N |
|---|---|---|---|
| calculated | 69.10 | 10.85 | 5.20 |
| found | 68.42 | 11.04 | 5.15 |

$^1$H-NMR (CDCl$_3$): 1:1 copolymer, epoxide rings no longer visible GPC (THF): $M_n$=3500 $M_w$=5200 DSC (10° C./min.): Tg=18° C.

B7) Copolymer of A1 and A5

22.7 g (0.1 mol) of 1,2,2,6,6-pentamethyl-4-(2,3-epoxypropoxy)piperidine (monomer A1 ), 21.3 g (0.1 mol) of 4-(2,3-epoxypropoxy)-2,2,6,6-tetramethylpiperidine (monomer A5), 448 mg (4 mmol) of potassium tert-butoxide and 448 mg of 18-crown-6 are introduced into a 100 ml round-bottom flask and freed from oxygen. The mixture is polymerized at 150° C. for 20 hours under argon. The polymer is dissolved in THF and precipitated in acetonitrile. This operation is repeated. The precipitated polymer is dried at 60° C. in a high vacuum.

Yield: 16.5 g (37%); $^1$H-NMR (CDCl$_3$): CH$_2$ (pentamethylpiperidine) 1.83–1.91 ppm; CH$_2$ (tetramethylpiperidine) 1.91–2.00 ppm; 1:1 copolymer. GPC (THF): $M_n$=1000 $M_w$=1800.

C) Use Examples

EXAMPLE C1: Light stabilization of polypropylene fibres 2.5 g of the stabilizer according to the invention together with 1 g of Tris(2,4-di-tert-butylphenyl) phosphite, 1 g of calcium monoethyl 3,5-di-tert-butyl-4,hydroxybenzyl phosphonate, 1 g of calcium stearate and 2.5 g of TiO$_2$ (Kronos RN 57), is mixed with 1000 g of polypropylene powder (melt flow index 12 g/10 min, measured at 230° C./2.16 kg) in a turbo mixer.

The mixtures are extruded at 200°–230° C. to give granules; these are subsequently converted into fibres using a pilot plant (Leonard; Sumirago/VA, Italy) under the following conditions:

| Extruder temperature: | 200–230° C. |
|---|---|
| Die head temperature: | 255–260° C. |
| Stretch ratio: | 1:3.5 |
| Stretch temperature: | 100° C. |
| Fibres: | 10 den |

The fibres produced in this way are placed in a circulating air oven heated to 120° C. for 20 minutes and then exposed against a white background in a Weather-O-Meter® Type 65WR (Atlas Corp.) with a black panel temperature of 63° C. in accordance with ASTM D 2565-85. After various exposure times, the residual tensile strength of the samples is measured. The measurement values are used to calculate the exposure time $T_{50}$ after which the tensile strength of the samples is only half as much.

For comparative purposes, fibres containing no stabilizer according to the invention are produced and tested under otherwise identical conditions. The results are shown in Table C1.

TABLE C1

| Exposure duration for the initial tensile strength to halve | |
|---|---|
| Stabilizer | Exposure duration |
| None | 300 h |

TABLE C1-continued

Exposure duration for the initial tensile strength to halve

| Stabilizer | Exposure duration |
|---|---|
| From Example B1 | 1920 h |
| From Example B4 | 2060 h |

The fibres stabilized according to the invention have excellent tenacity.

EXAMPLE C2: Stabilization of a two-coat finish

The light stabilizers are incorporated in 5–10 g of xylene and tested in a varnish of the following composition:

| | |
|---|---|
| Synthacryl ® SC 303[1] | 27.51 |
| Synthacryl ® SC 370[2] | 23.34 |
| Maprenal ® MF 650[3] | 27.29 |
| Butyl acetate/butanol (37/8) | 4.33 |
| Isobutanol | 4.87 |
| Solvesso ® 150[4] | 2.72 |
| Crystal oil K-30[5] | 8.74 |
| Flow-control agent Baysilon ® MA[6] | 1.20 |
| | 100.00g |

[1] Acrylate resin, Hoechst AG; 65% solution in xylene/butanol 26:9
[2] Acrylate resin, Hoechst AG; 75% solution in Solvesso ® 100[4]
[3] Melamin resin, Hoechst AG; 55% solution in isobutanol
[4] Manufacturer: ESSO
[5] Manufacturer: Shell
[6] 1% in Solvesso ® 150; manufacturer: Bayer AG 1% of stabilizer, based on the solids content of the varnish, is added to the varnish. The comparison used is a varnish containing no light stabilizer.

The varnish is thinned to a sprayable consistency using Solvesso® 100 and sprayed onto a prepared aluminium sheet (coil coat, filler, silver-metallic base coat) and baked at 130° C. for 30 minutes, giving a dry film thickness of 40–50 µm of varnish.

The samples are then weathered in a UVCON® weathering instrument from Atlas Corp. (UVB-313 lamps) with a cycle of UV radiation at 60° C. for 4 hours and condensation at 50° C. for 4 hours.

The samples are examined regularly for cracking. The results are shown in Table C2.

TABLE C2

Weathering time before cracking

| Stabilizer | Cracking after |
|---|---|
| None | 1200 h |
| From Example B1 | 4800 h |
| From Example B2 | >4800 h |
| From Example B3 | >4800 h |
| From Example B4 | >4800 h |

The samples containing the stabilizers according to the invention have high resistance to cracking.

EXAMPLE C3: Stabilization of a photographic material 0.087 g of the yellow coupler of the formula

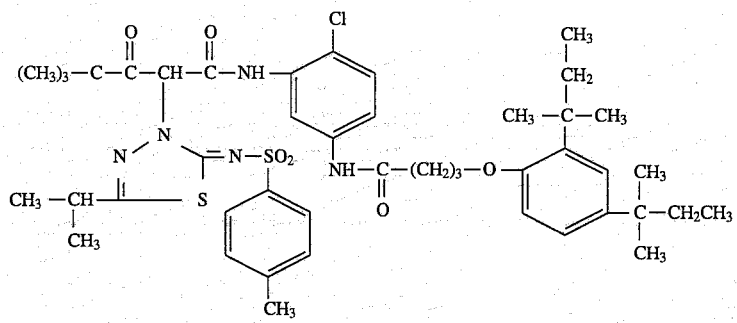

are dissolved in 2.0 ml of an ethyl acetate solution of the stabilizer according to the invention (2.25 g/100 ml). 9.0 ml of a 2.3% aqueous gelatin solution which has been adjusted to a pH of 6.5 and contains 1.744 g/l of the wetting agent of the formula

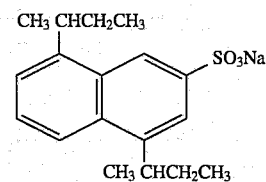

are added to 1.0 ml of this solution.

2 ml of a silver bromide emulsion having a silver content of 6.0 g/l and 1.0 ml of a 0.7% aqueous solution of the curing agent of the formula

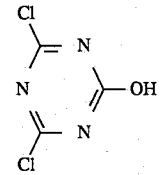

are added to 5.0 ml of the resultant coupler emulsion, and the mixture is poured onto a 13×18 cm plastic-coated paper. After a curing time of 7 days, the samples are exposed with 125 Lux.s behind a silver step wedge and subsequently processed by the Kodak Ektaprint 2® process.

The yellow wedges obtained are irradiated with a total of 60 kJ/cm² in an Atlas Weather-O-Meter by means of a 2500 W xenon lamp behind a UV filter (Kodak 2C).

A sample without stabilizer is coated in the same way as standard.

The drop in colour density at the absorption maximum of the yellow dye, which occurs during irradiation, is measured using a Macbeth TR 924A densitometer.

The light stabilization effect is evident from the drop in colour density. The smaller the drop in density, the higher the light stabilization effectiveness.

The stabilizers according to the invention have a good light stabilization action.

What is claimed is:

1. A polyether of the formula I

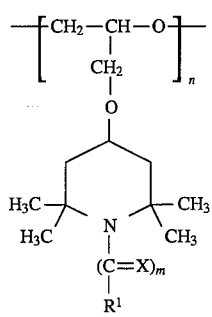

in which m is 0 or 1; n is an integer in the range from 3 to 100; $R^1$, in the case where m is 0 or 1, is $C_1$–$C_{36}$alkyl or $C_7$–$C_{36}$aralkyl, each of which is unsubstituted or substituted by $C_5$–$C_8$acycloalkyl, interrupted in the aliphatic part by $C_5$–$C_8$cycloalkylene or by oxygen or sulfur or —$NR^{11}$— or is substituted in the aromatic part by 1 to 3 $C_1$–$C_4$alkyl and/or $C_1$–$C_4$alkoxy radicals; $C_3$–$C_{36}$alkenyl; $C_5$–$C_{12}$cycloalkyl which is unsubstituted or substituted by 1 to 4 $C_1$–$C_4$alkyl and/or $C_6$–$C_4$alkoxy radicals; $C_6$–$C_{10}$aryl which is unsubstituted or substituted by 1 to 4 $C_1$–$C_4$alkyl and/or $C_1$–$C_4$alkoxy radicals; and $R^1$, in the case where m is 0, can alternatively be hydrogen; $C_1$–$C_{36}$alkoxy or $C_7$–$C_{36}$aralkoxy, each of which is unsubstituted or substituted by $C_5$–$C_8$cycloalkyl, interrupted in the aliphatic part by $C_5$–$C_8$cycloalkylene or by oxygen or sulfur or —$NR^{11}$— or is substituted in the aromatic part by 1 to 3 $C_1$–$C_4$alkyl and/or $C_1$–$C_4$alkoxy radicals; $C_3$–$C_{36}$alkenyloxy; $C_5$–$C_{12}$cycloalkoxy which is unsubstituted or substituted by 1 to 4 $C_1$–$C_4$alkyl and/or $C_1$–$C_4$alkoxy radicals; or $C_6$–$C_{10}$aryloxy which is unsubstituted or substituted by 1 to 4 $C_1$–$C_4$alkyl and/or C–$C_4$alkoxy radicals; $R^{11}$ is $C_1$–$C_{18}$alkyl, $C_5$–$C_8$cycloalkyl, phenyl or $C_7$–$C_9$phenylalkyl; and X is an oxygen or sulfur atom.

2. A polyether according to claim 1, in which m is 0.

3. A polyether according to claim 1, in which n is an integer in the range from 4 to 50; $R^1$, in the case where m is 0 or 1, is $C_2$–$C_{36}$alkyl; $C_2$–$C_{36}$alkyl which is interrupted by —O—; $C_7$–$C_{36}$aralkyl; $C_7$–$C_{36}$aralkyl which is interrupted in the aliphatic part by —O— and/or is substituted in the aromatic part by 1 to 3 radicals selected from the group consisting of $C_1$–$C_4$alkyl and $C_1$–$C_4$alkoxy radicals; $C_5$–$C_9$cycloalkyl which is unsubstituted or substituted by 1 to 3 $C_1$–$C_4$alkyl or $C_1$–$C_4$alkoxy radicals; or phenyl which is unsubstituted or substituted by 1 to 3 $C_1$–$C_4$alkyl or $C_1$–$C_4$alkoxy radicals; and $R^1$, in the case where m is 0, can alternatively be $C_1$–$C_{36}$alkoxy; $C_2$–$C_{36}$alkoxy which is interrupted by —O—; $C_7$–$C_{36}$aralkoxy; $C_7$–$C_{36}$aralkoxy which is interrupted in the aliphatic part by —O— or is substituted in the aromatic part by 1 to 3 $C_1$–$C_4$alkyl or $C_1$–$C_4$alkoxy radicals; $C_5$–$C_9$cycloalkoxy which is unsubstituted or substituted by 1 to 3 $C_1$–$C_4$alkyl or $C_1$–$C_4$alkoxy radicals; or phenoxy which is unsubstituted or substituted by 1 to 3 $C_1$–$C_4$alkyl and/or $C_1$–$C_4$alkoxy radicals; and X is an oxygen atom.

4. A polyether according to claim 3, in which m is 0; $R^1$ is $C_1$–$C_{18}$alkyl; $C_4$–$C_{36}$alkoxy; $C_2$–$C_{18}$alkyl which is interrupted by —O—; C$_4$–$C_{36}$alkoxy which is interrupted by —O—; $C_7$–$C_{18}$phenylalkyl; $C_7$–$C_{18}$phenylalkoxy; $C_7$–$C_{18}$phenylalkyl and $C_7$–$C_{18}$aphenylalkoxy, each of which is substituted on the phenyl ring by 1 to 3 $C_1$–$C_4$alkyl radicals; $C_5$–$C_9$cycloalkyl; $C_5$–$C_9$cycloalkoxy; phenyl which is unsubstituted or substituted by 1 to 3 $C_1$–$C_4$alkyl radicals; or phenoxy which is unsubstituted or substituted by 1 to 3 $C_1$–$C_4$alkyl radicals.

5. A polyether according to claim 4, in which m is 0; and $R^1$ is $C_1$–$C_{18}$alkyl; $C_4$–$C_{18}$alkoxy; $C_2$–$C_{18}$alkyl which is interrupted by —O—; C$_4$–$C_{36}$alkoxy which is interrupted by —O—; $C_7$–$C_9$phenylalkyl; $C_7$–$C_9$phenylalkoxy; $C_7$–$C_9$phenylalkyl or $C_7$–$C_9$phenylalkoxy, each of which is substituted on the phenyl ring by 1 to 3 $C_1$–$C_4$alkyl radicals; $C_5$–$C_9$cycloalkyl; $C_5$–$C_9$cycloalkoxy; or phenoxy which is unsubstituted or substituted by 1 to 3 $C_1$–$C_4$alkyl radicals.

6. A polyether according to claim 5, in which n is an integer in the range from 5 to 30; and $R^1$ is $C_1$–$C_{18}$alkyl; $C_4$–$C_{18}$alkoxy; $C_7$–$C_9$phenylalkyl; or $C_5$–$C_9$cycloalkoxy.

* * * * *